US012103755B2

(12) United States Patent
Behn

(10) Patent No.: US 12,103,755 B2
(45) Date of Patent: Oct. 1, 2024

(54) REED STORAGE APPARATUS FOR HUMIDITY CONTROL

(71) Applicant: BBSR Holdings, LLC, Edmond, OK (US)

(72) Inventor: Bradford Behn, Edmond, OK (US)

(73) Assignee: BBSR Holdings, LLC, Edmond, OK (US)

( * ) Notice: Subject to any disclaimer, the term of this patent is extended or adjusted under 35 U.S.C. 154(b) by 1 day.

(21) Appl. No.: 18/107,650

(22) Filed: Feb. 9, 2023

(65) Prior Publication Data

US 2024/0270474 A1 Aug. 15, 2024

(51) Int. Cl.
*B65D 81/22* (2006.01)
*B65D 21/02* (2006.01)
(Continued)

(52) U.S. Cl.
CPC ......... *B65D 81/22* (2013.01); *B65D 21/0212* (2013.01); *B65D 53/02* (2013.01);
(Continued)

(58) Field of Classification Search
CPC .... B65D 81/22; B65D 21/0212; B65D 53/02; B65D 63/109; B65D 81/263; B65D 85/54; G10D 9/00
(Continued)

(56) References Cited

U.S. PATENT DOCUMENTS

| | | |
|---|---|---|
| 1,997,820 A | 4/1935 | Govoni |
| 2,227,158 A | 12/1940 | Saul |

(Continued)

FOREIGN PATENT DOCUMENTS

| | | | |
|---|---|---|---|
| CN | 108163375 | * | 1/2018 |
| FR | 630797 | | 12/1927 |

(Continued)

OTHER PUBLICATIONS

"D'Addario Woodwinds Multi-reed Storage Case," webpage <https://www.daddario.com/products/woodwinds/woodwinds-accessories/reed-care-and-storage/multi-reed-storage-case/>, 1 page, Sep. 18, 2020, retrieved from Internet Archive Wayback Machine <https://web.archive.org/web/20200918235031/https://www.daddario.com/products/woodwinds/woodwinds-accessories/reed-care-and-storage/multi-reed-storage-case/> on Mar. 23, 2023.

(Continued)

*Primary Examiner* — Rafael A Ortiz
(74) *Attorney, Agent, or Firm* — Crowe & Dunlevy; Tynia A. McQuigg

(57) ABSTRACT

An apparatus and method for storing reeds. The apparatus includes a tray having a first platform and a second platform opposite from the first platform where each platform includes a plurality of reed passages, an inner recess between the first and second platforms, and a plurality of ventilation apertures on the first and second platforms. The tray may be removably configured within an airtight container. A method for storing reeds includes positioning a humidity-control insert within an inner recess of a tray, having a first platform, a second platform opposite from the first platform, an inner recess between the first and second platforms, and a plurality of reed passages on the first and second platforms, wherein each of the plurality of reed passages may include ventilation apertures. The method further includes placing a reed within one of the reed passages and securing the reed with an elastic band.

17 Claims, 17 Drawing Sheets

(51) Int. Cl.

| | |
|---|---|
| ***B65D 53/02*** | (2006.01) |
| ***B65D 63/10*** | (2006.01) |
| ***B65D 81/26*** | (2006.01) |
| ***B65D 85/00*** | (2006.01) |
| ***G10D 9/00*** | (2020.01) |

(52) U.S. Cl.
CPC ......... *B65D 63/109* (2013.01); *B65D 81/263* (2013.01); *B65D 85/54* (2013.01); *G10D 9/00* (2013.01); *B65D 2563/101* (2013.01); *B65D 2585/54* (2013.01)

(58) Field of Classification Search
USPC ....... 206/314, 561, 564, 567, 204; 211/41.3; 984/141, 142; 220/528
See application file for complete search history.

(56) References Cited

U.S. PATENT DOCUMENTS

| | | | | | |
|---|---|---|---|---|---|
| 2,545,599 | A | | 3/1951 | Bartlett | |
| 2,604,978 | A | | 7/1952 | Maier | |
| 2,910,173 | A | | 10/1959 | Fenburr | |
| 2,937,740 | A | | 5/1960 | Bruckmann | |
| 3,250,283 | A | * | 5/1966 | Reinfeld | A47L 17/02 134/201 |
| 3,393,793 | A | | 7/1968 | Eresman | |
| 3,670,871 | A | | 6/1972 | Thomas | |
| 4,089,412 | A | | 5/1978 | Baugh | |
| 4,225,041 | A | | 9/1980 | Lorenzini | |
| 4,250,995 | A | | 2/1981 | Lorenzini | |
| 4,352,428 | A | * | 10/1982 | Pascucci | G10D 9/035 984/142 |
| 4,674,630 | A | | 6/1987 | Kirck | |
| 5,035,731 | A | | 7/1991 | Spruill et al. | |
| 6,006,903 | A | * | 12/1999 | Milone | A24F 15/20 312/271 |
| 6,593,516 | B1 | | 7/2003 | Schafer et al. | |
| 6,620,992 | B1 | | 9/2003 | Kinnaird | |
| 7,987,978 | B1 | * | 8/2011 | Lam | A45C 11/00 206/483 |
| 2007/0221039 | A1 | | 9/2007 | Quaile, Sr. | |
| 2012/0031780 | A1 | | 2/2012 | Milner et al. | |
| 2014/0326621 | A1 | * | 11/2014 | Chang | B65D 81/268 206/204 |
| 2019/0031422 | A1 | * | 1/2019 | Lai | B01L 3/508 |

FOREIGN PATENT DOCUMENTS

| | | |
|---|---|---|
| KR | 101595806 | 2/2016 |
| KR | 20210002950 | 1/2021 |

OTHER PUBLICATIONS

"La Voz reedgard 70s-Metal," webpage <https://reverb.com/item/65613529-la-voz-reedgard-70s-metal>, 2 pages, retrived on Mar. 23, 2023 (product listed "2 months ago").

"Bambu Hand-Crafted Hardwood Bb Clarinet/Alto Saxophone Reed Case—Holds 10 Reeds," webpage <https://www.prowinds.com/product/10957/756?utm_source=google&utm_medium=surfaces&utm_campaign=Surfaces%20Shopping&utm_content=google%20surfaces%20shopping&gclid=CjwKCAiArNOeBhAHEiwAze_nKO6ZWkyLDaRA7s5dg_IRXVUf6fgsiVM6vGeaiSHafROrvhCbS582BhoCsk8QAvD_BwE>, 1 page, retrieved on Mar. 23, 2023.

"Vandoren Hygro Reed Case for Small Reeds," webpage <https://www.prowinds.com/product/HRC10>, 1 page, retrieved on Mar. 23, 2023.

* cited by examiner

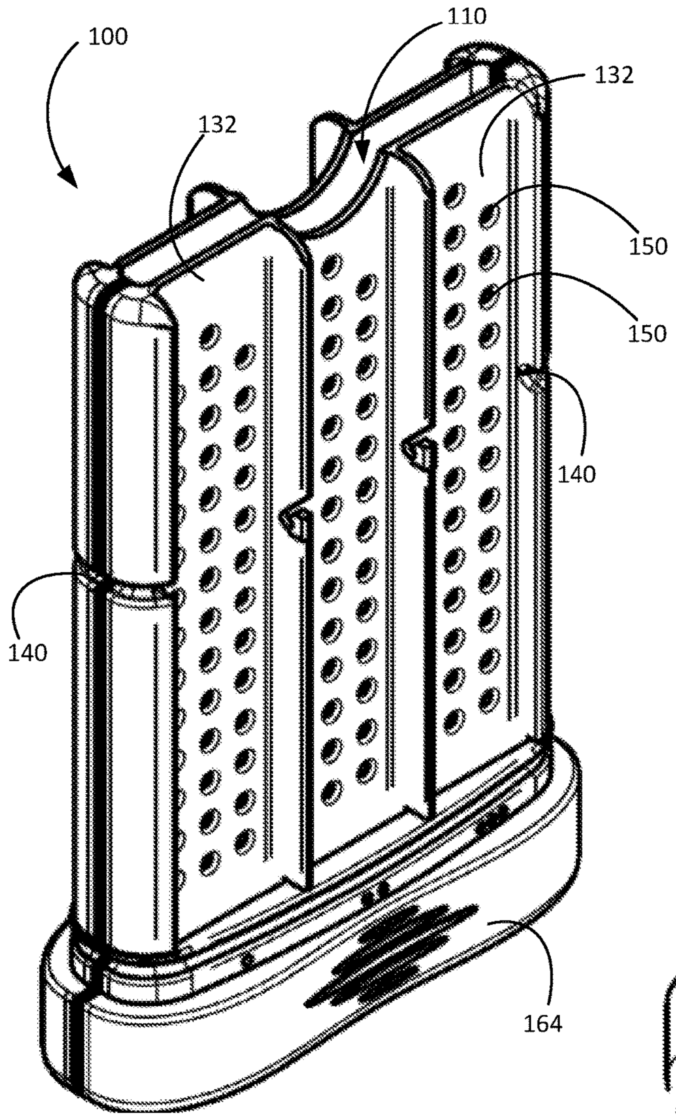
FIG. 17
FIG. 18
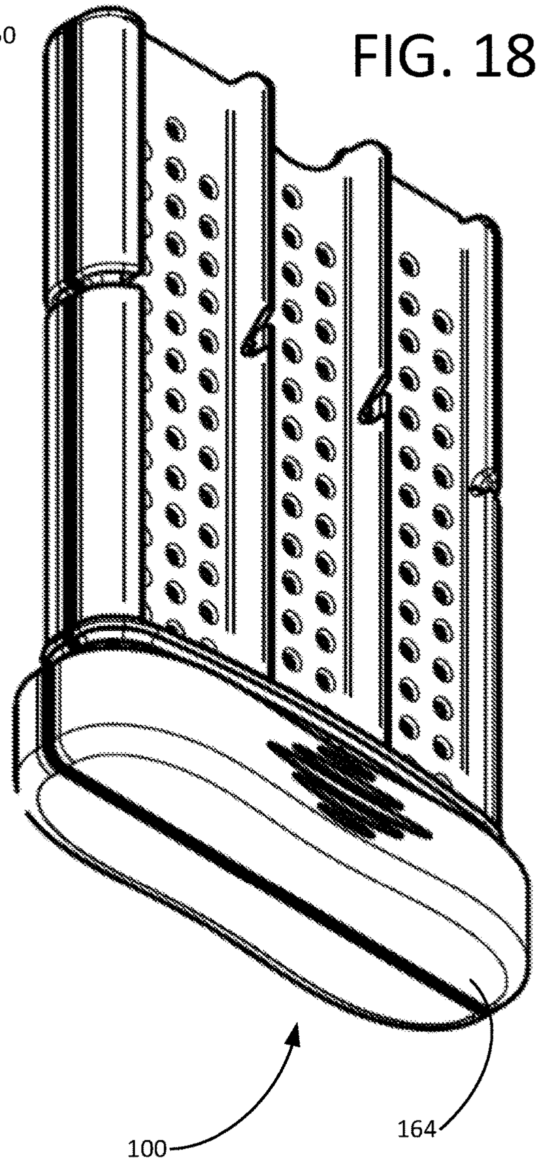

REED STORAGE APPARATUS FOR HUMIDITY CONTROL

BACKGROUND OF THE INVENTION

1. Field of the Invention

This invention generally relates to the storage of instrument reeds and, more particularly, to an apparatus and method for storing single reeds with proper humidity control.

2. Description of the Related Art

A woodwind instrument relies upon reed vibrations to produce sound. When playing a woodwind instrument, a musician blows air between the instrument's mouthpiece and a reed that is attached at a table of the mouthpiece by a ligature. Variations in the vibration of the reed result in different tones produced by the instrument. Specifically, the reed vibrates at its vamp, or blade, when the musician blows air into the mouthpiece/reed combination. Single-reed instruments are those woodwind instruments, such as clarinets and saxophones, that use a single reed. These single reeds are generally rectangular and are configured with a stock at one end and the thin, tapered vamp at the opposite end, where the tip of the vamp is curved to match the curve at the end of the instrument's mouthpiece.

Reeds are available in many shapes, sizes, and materials. The most common reed material is cane, such as *Arundo donax*. Reeds made from natural cane provide a warmer tone than many synthetic reed alternatives and are, therefore, preferred by many musicians. However, these reeds are also prone to warpage, as they are affected by temperature and humidity. Natural cane reeds must also be moistened before playing; thus, great care must be taken to ensure that mold does not form on the reeds during post-play storage. Further, cane reeds must be carefully stored to prevent contact damage, as they are less durable than synthetic reeds.

Several cases have been proposed to store and protect cane reeds. These cases are designed for the user to place a reed either on a flat surface or within a designated groove. Flat surfaces, such as glass, do not allow a moistened reed to dry with uniformity following play. Reeds stored on these surfaces often experience warpage due to shrinkage as the humidity level decreases. A warped reed is unable to mate properly to the table of a mouthpiece, thereby causing performance issues—e.g., poor tone quality, unreliable response, increased air resistance, and limited dynamic range. Grooved surfaces are designed to provide air ventilation to reeds that are placed within the recessed groove areas. Cases with grooved surfaces offer greater protection against warpage than those with a purely flat surface; however, these cases are still only partially effective at allowing a moistened reed to dry with uniformity.

The introduction of humidity control helps to reduce the possibility of warpage. Consequently, one solution to the deficiencies of cases with flat or grooved surfaces is to provide humidity control to allow reeds to dry out to a specified humidity level. Known methods of humidity control include placing orange peels or portions of a moistened sponge inside of a reed case within a resealable plastic bag. The plastic bag solution to humidity control is undesirable for performing musicians, as these bags create loud, distracting noises from a stage. Other methods of humidity control replace the resealable plastic bag with a wooden enclosure; however, these wooden enclosures can become de-varnished from the abundance of humidity. Further, these methods of humidity control require the musician to use a hygrometer within the bag/enclosure to carefully monitor the humidity level. If humidity levels are not properly controlled, mold can develop on the reeds.

To combat the likelihood of mold, some companies have developed a method of enclosing desiccants within a reed case to pull out unwanted moisture. Although these methods assist in mold control, they tend to over-dry the stored reeds, and warpage can ensue. Other companies enclose an absorbent media within the reed case and instruct the musician to add water when a litmus paper suggests that it is necessary. This method offers greater control over moisture levels but requires careful monitoring by the musician.

A recurring problem for each of these cases is that humidity control is not distributed evenly throughout the case. A need exists, therefore, for an improved reed storage apparatus and method to protect cane reeds from warpage and contact damage while maintaining proper humidity control throughout the case.

SUMMARY OF THE INVENTION

Accordingly, it is an object of this invention to provide a new and useful reed storage apparatus and method to maintain proper humidity levels for ideal reed performance and to distribute humidity evenly to reeds within the apparatus.

This disclosure relates to a storage apparatus and method for storing reeds. The apparatus includes a tray having a first platform with a first plurality of reed passages, a second platform opposite from the first platform with a second plurality of reed passages, an inner recess between the first platform and the second platform, and a plurality of ventilation apertures on the first platform and the second platform.

In one embodiment, an end of the tray includes a slot to receive a humidity-control insert.

In one embodiment, each of the first and second plurality of reed passages holds a reed between two guide walls.

In one embodiment, the first platform includes the same number of reed passages as the second platform.

In one embodiment, each of the plurality of ventilation apertures is positioned between the guide walls of one of the first or second plurality of reed passages.

In one embodiment, each of the first and second plurality of reed passages includes a plurality of rails which are configured to elevate a reed within the corresponding passage.

In one embodiment, the storage apparatus includes an elastic band that extends across the first and second platform.

In one embodiment, each of the guide walls includes a notch, wherein the elastic band is received within the notches.

In one embodiment, the storage apparatus further includes an airtight container in which the tray is removably configured.

In one embodiment, the airtight container is a case with a lid, a base, and an O-ring gasket.

In one embodiment, the storage apparatus further includes a second tray configured to be magnetically secured to the tray.

In general, in a second aspect, this disclosure relates to an apparatus for storing reeds with distributed humidity control. More specifically, the apparatus includes an airtight container; a tray having a first platform with a first plurality of reed passages, a second platform opposite from the first platform with a second plurality of reed passages, an inner recess between the first platform and the second platform, and a plurality of ventilation apertures on the first platform and the second platform. The tray is removably configured within the airtight container.

In one embodiment, an end of the tray includes a slot to receive a humidity-control insert.

In one embodiment, each of the first and second plurality of reed passages holds a reed between two guide walls, wherein each of the guide walls include a notch.

In one embodiment, the apparatus further includes an elastic band that extends across the first platform and the second platform and is received within the notches.

In one embodiment, each of the first and second plurality of reed passages further comprises a plurality of rails, which are configured to elevate a reed within the corresponding reed passage.

In one embodiment, the airtight container is a case comprising a lid, a base, and an O-ring gasket.

In general, in a third aspect, the disclosure relates to a method for storing reeds. The method includes positioning a humidity-control insert within an inner recess of a tray, wherein the tray includes a first platform, a second platform opposite from the first platform, the inner recess between the first platform and the second platform, and a plurality of reed passages on the first platform and the second platform, wherein each of the plurality of reed passages includes a plurality of ventilation apertures. The method also includes placing a reed within one of the plurality of reed passages and securing the reed within the reed passage with an elastic band.

In one embodiment, the method further includes placing the tray within an airtight container.

In one embodiment, each of the plurality of reed passages further comprises a plurality of rails, which are configured to elevate a reed.

BRIEF DESCRIPTION OF THE DRAWINGS

The above and other objects and advantages of this invention may be more clearly seen when viewed in conjunction with the accompanying drawing wherein:

FIGS. 17 and 18 depict perspective views of an example of a double-sided reed tray constructed in accordance with an illustrative embodiment disclosed herein.

DETAILED DESCRIPTION OF THE INVENTION

Figure 1:
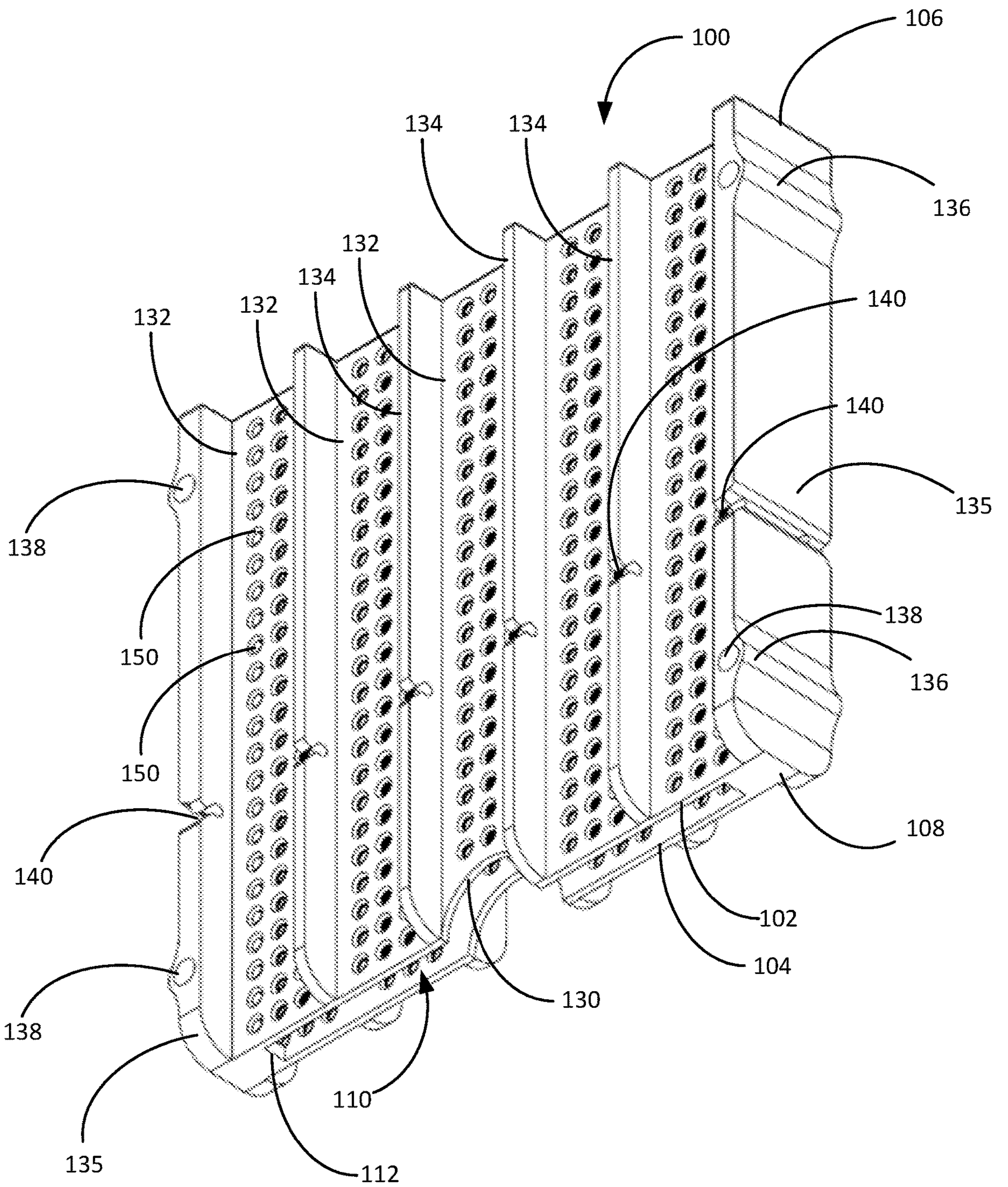
FIG. 1 depicts a perspective view for a double-sided reed tray constructed in accordance with an illustrative embodiment disclosed herein.

While this invention is susceptible to embodiment in many different forms, there are shown in the drawings and will herein be described hereinafter in detail some specific embodiments of the invention. It should be understood, however, that the present disclosure is to be considered an exemplification of the principles of the invention and is not intended to limit the invention to the specific embodiments so described.

Figure 2:
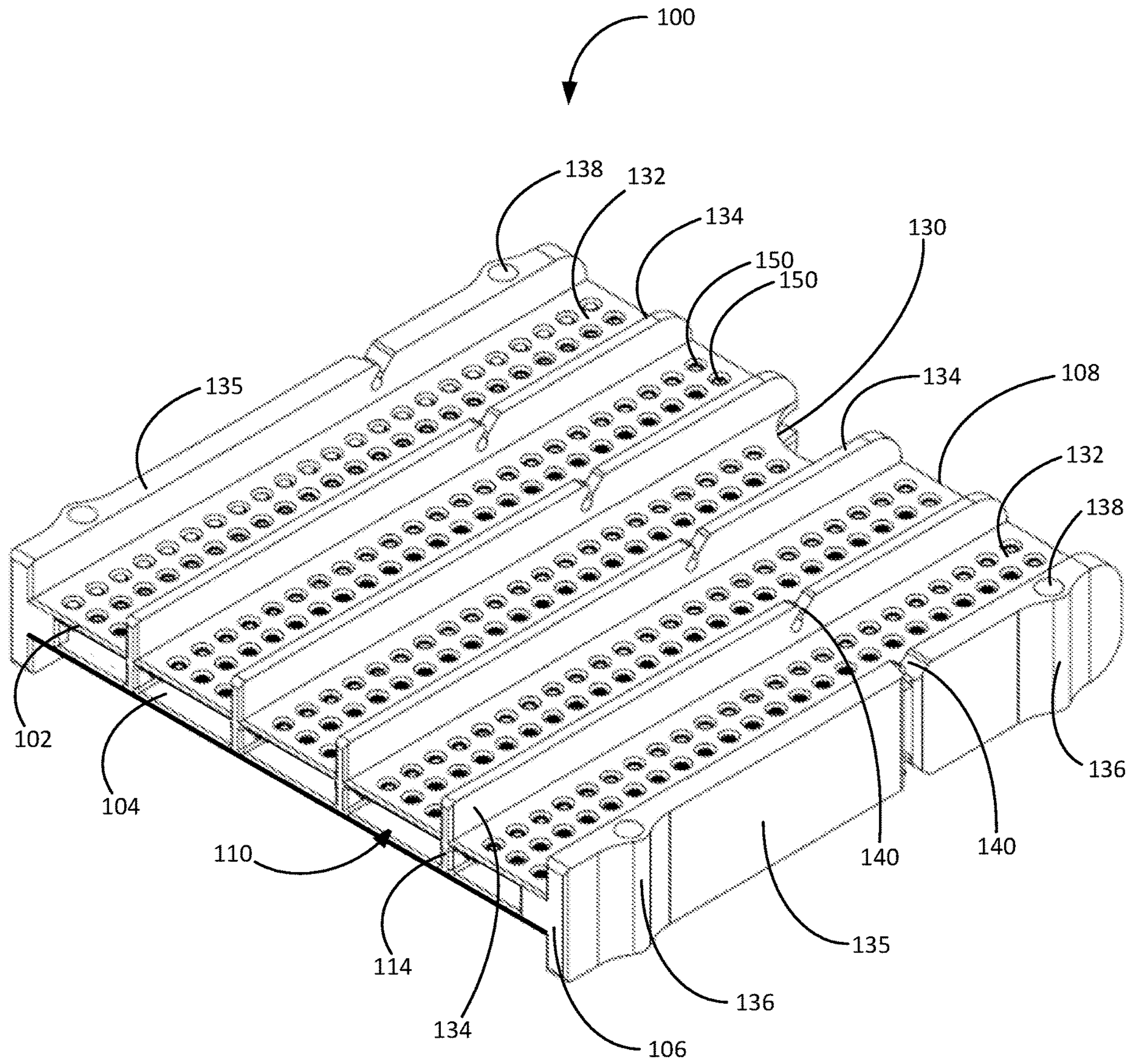
FIG. 2 depicts a perspective view for a reed tray constructed in accordance with an illustrative embodiment disclosed herein.
Figure 6A:
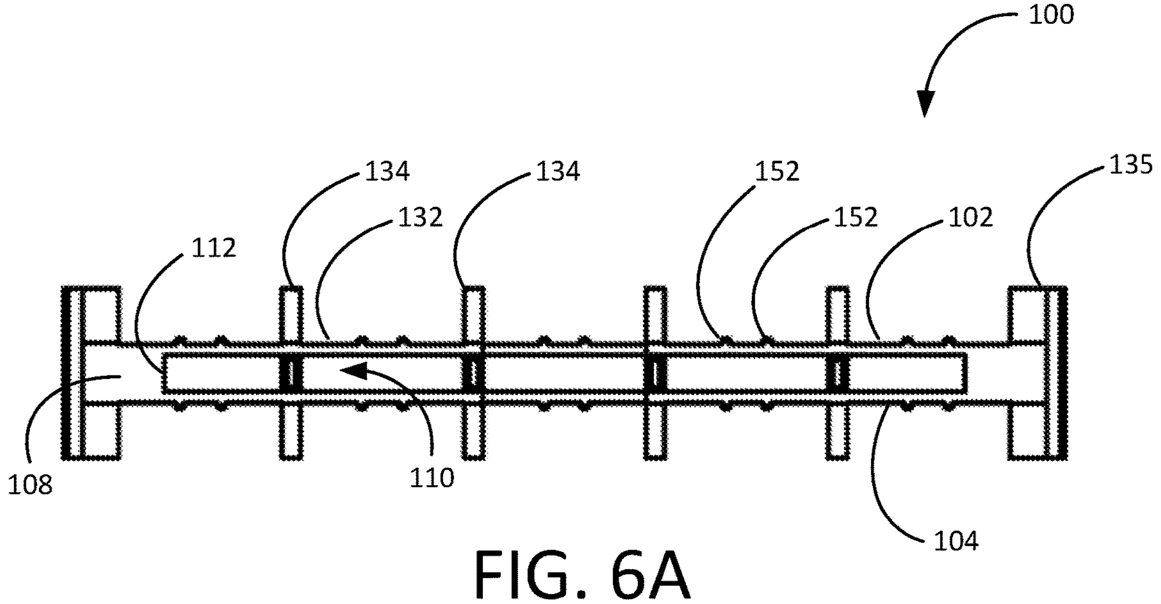
FIGS. 6A and 6B depict bottom and top views respectively of the double-sided reed tray of FIGS. 4 and 5.
Figure 6B:
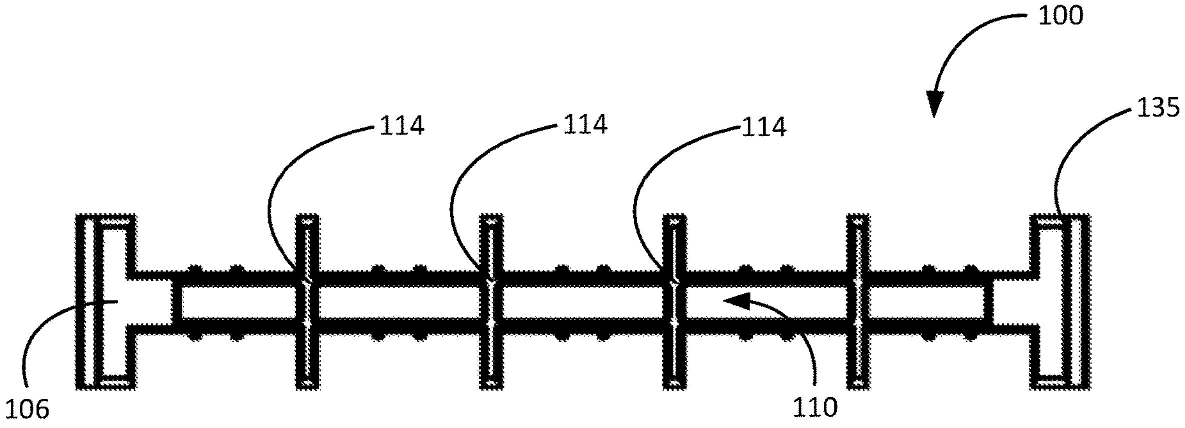

Referring now to the figures of the drawings, wherein like numerals of reference designate like elements throughout the several views, and initially to FIG. 1, a double-sided reed tray 100 is shown in accordance with an exemplary embodiment. In an embodiment, and as illustrated in FIGS. 1 and 2, the tray 100 has a first platform 102 a second platform 104, a top end 106, and a bottom end 108. Preferably, the first platform 102 and the second platform 104 are a flat surface. An inner recess 110 is configured between the first platform 102 and the second platform 104. The bottom end 108 may include a slot 112 through which a humidity-control insert (not shown) is placed into the inner recess 110. The inner recess 110 may be configured to accommodate humidity-control inserts of different sizes. In some embodiments, the recess 110 may extend from the top end 106 of the tray 100 to the bottom end 108 of the tray 100. The top end 106 of the tray 100 may be configured to secure the humidity-control insert within the inner recess 110 using a plurality of barriers 114. In some embodiments, the top end 106 of the tray 100 may be closed to secure the humidity-control insert within the inner recess 110. The humidity-control insert may be, for example, a "two-way" humidity pack which maintains an ideal atmosphere for a reed 120 (as depicted in FIG. 6) to incubate and stabilize during the various break-in through performance stages or lifespan of the reed 120.

In some embodiments, the humidity-control insert may be a Boveda® humidity control pack. In other embodiments, the humidity-control insert may be a humidity control pack offered by another manufacturer. Although a manufactured two-way humidity pack is preferable for optimal humidity control, it will be appreciated that the humidity-control insert may be any system that is suitable for maintaining an ideal atmosphere for reed incubation and stabilization, such as a sponge or a shammy cloth soaked in water. The level of humidity control desired will depend on the type of reed stored. For example, the humidity-control insert may be configured to maintain between 72% to 85% humidity.

A curved indent 130 may be configured at the bottom end 108 of the first platform 102 and the second platform 104 to facilitate easier access to the humidity-control insert during insertion or removal.

As illustrated in FIG. 1, the first platform 102 and the second platform 104 may include a plurality of reed passages 132, wherein each reed passage 132 is sized to accommodate the placement of one reed 120. The size of each reed passage 132 may vary depending on the type of reed to be stored. For example, the reed passages 132 may be sized to accommodate a smaller single reed, such as that for a Bb clarinet, or a larger single reed, such as that for a saxophone. Each reed passage 132 is defined by two guide walls 134 that are attached to and extend from the corresponding platform 102, 104 at a perpendicular or substantially perpendicular orientation.

FIG. 2 depicts an exemplary embodiment wherein the first platform 102 may include a plurality of reed passages 132, wherein each reed passage 132 is sized to accommodate the placement of reed 120, and the second platform 104 may be a flat surface without a plurality of reed passages 132 with guide walls 134.

Figure 3:
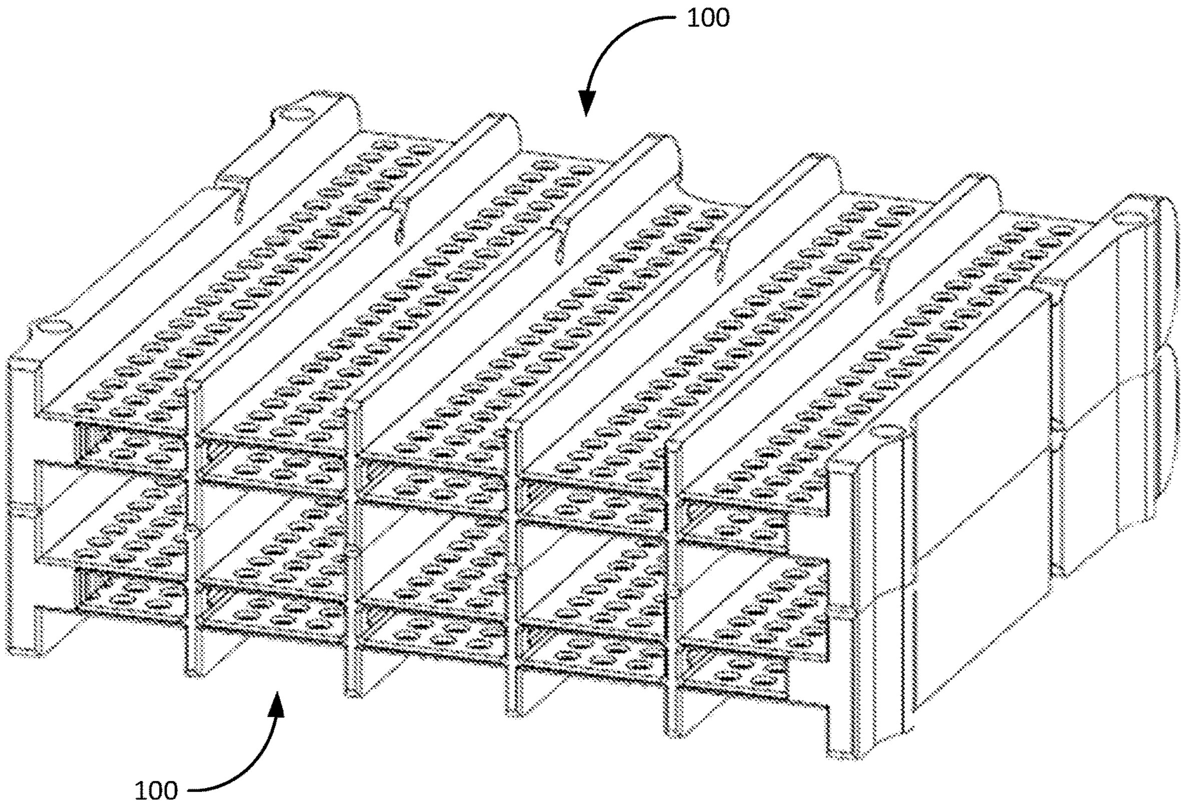
FIG. 3 depicts an example of a first double-sided reed tray of FIG. 1 magnetically stacked on top of a second double-sided reed tray of FIG. 1.

As illustrated in FIGS. 1 and 3, guide walls 134 on the first platform 102 and the second platform 104 may correspond and connect to the plurality of barriers 114 at the top end 106 of the tray 100 to secure the humidity-control insert within the inner recess 110. Outer guide walls 135 may be a single wall that extends above the first platform 102 and the second platform 104. Alternatively, the outer guide walls 135 may be include separate pieces that are configured to connect together to secure the first platform 102 to the second platform 104. In such embodiments, the separate pieces of the outer guide walls 135 may be connected via glue, snaps, hooks or other known mechanisms. The outer guide walls 135 may include one or more ridges 136, wherein each ridge 136 accommodates a stacking aperture 138. In some embodiments, a magnet may be inserted into each stacking aperture 138. These magnets may permit two or more trays 100 to be magnetically secured to one another. It will be appreciated that other suitable connection means may be placed within the stacking aperture 138 to removably secure a first tray 100 to a second tray 100, including hook-and-loop fasteners or snap fasteners. FIG. 3 illustrates a first tray 100 stacked and removably secured on top of a second tray 100 using magnets (not shown).

Figure 5:
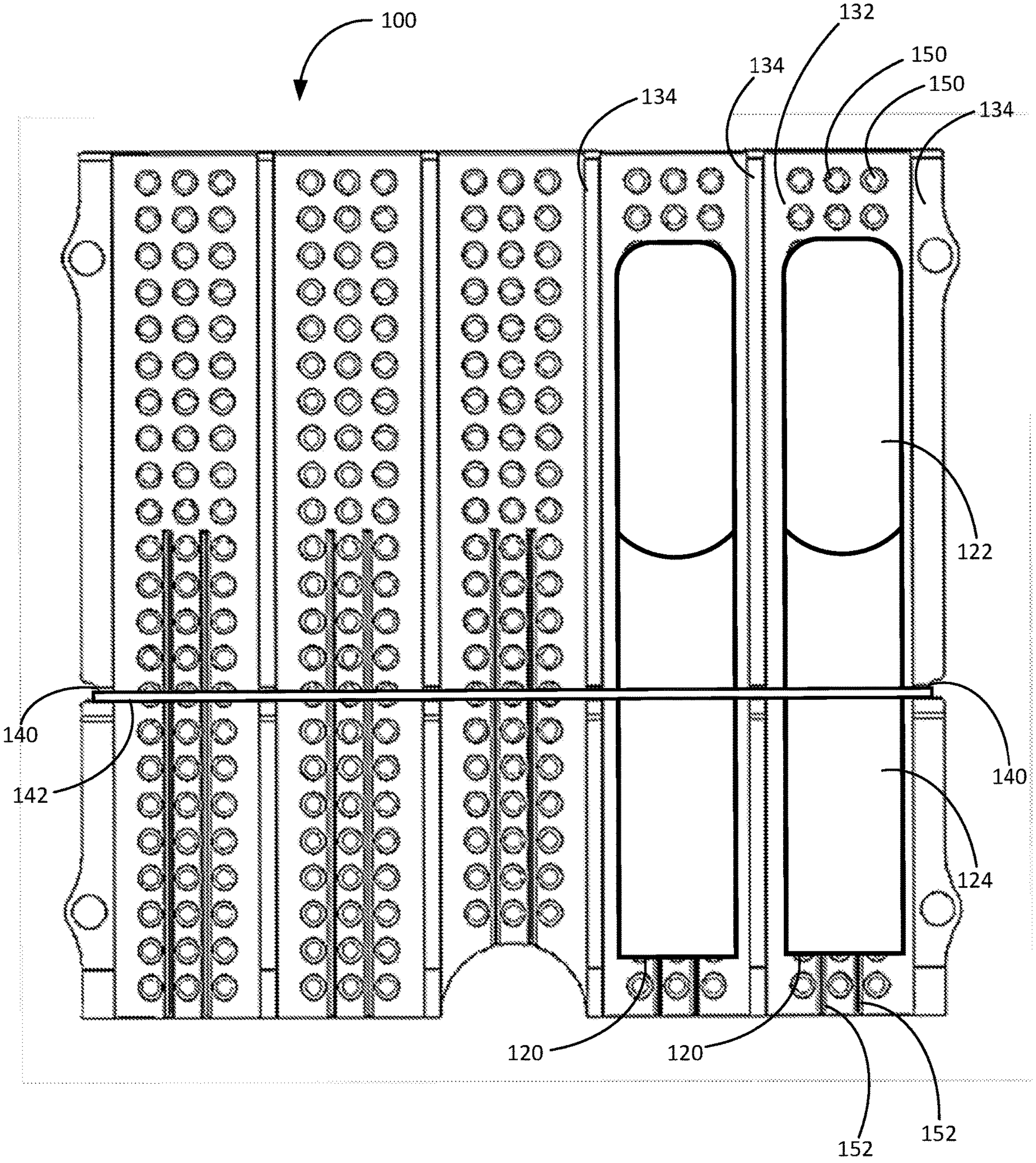
FIG. 5 depicts a side view of the double-sided reed tray of FIG. 4 in use with two single reeds.
Figure 9:
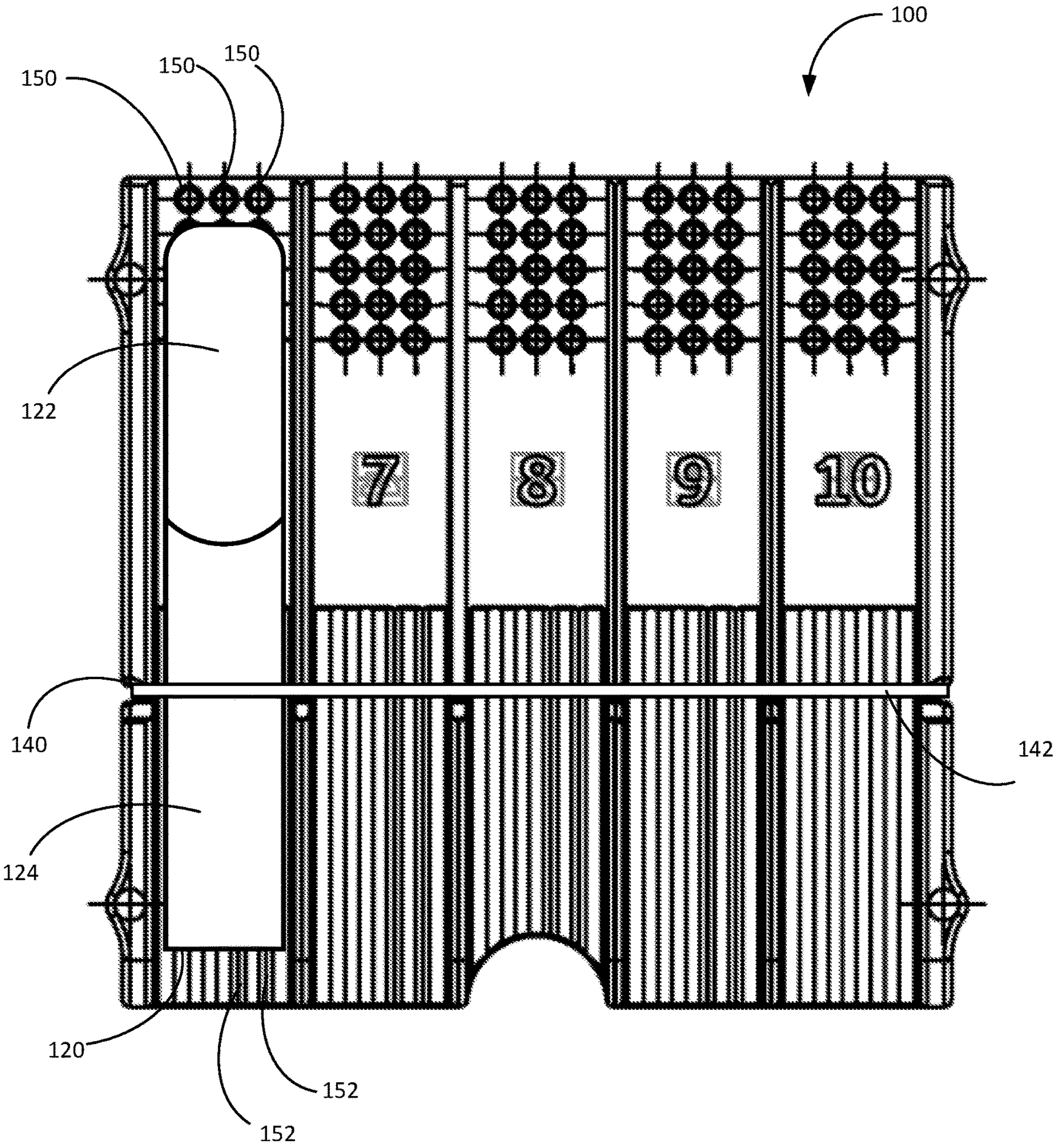
FIG. 9 depicts a side view of the double-sided reed tray of FIGS. 7 and 8 in use with a single reed.
Figure 10A:
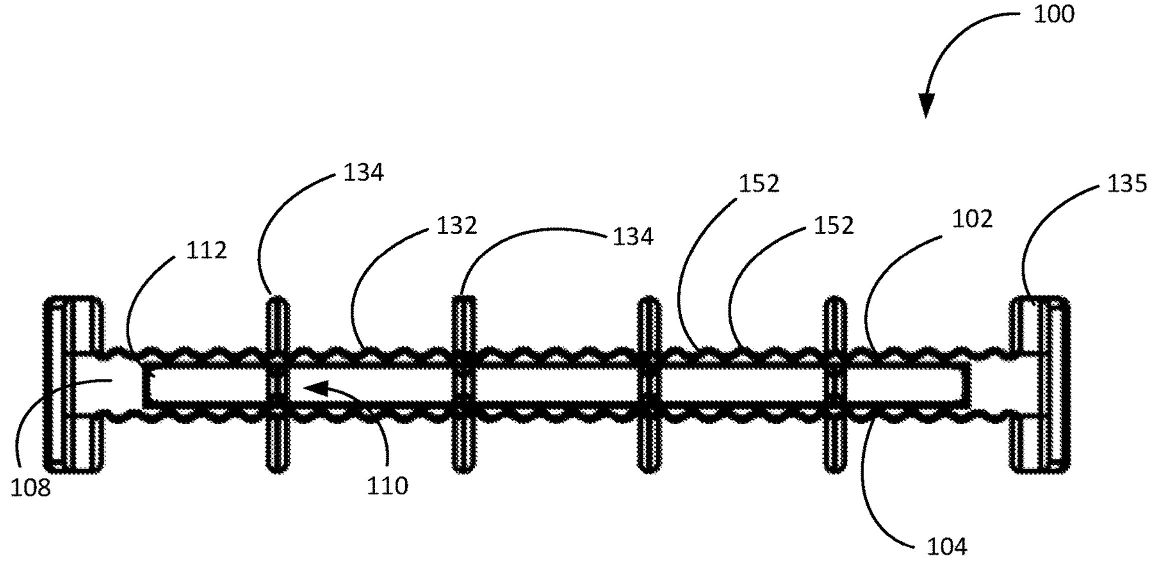
FIGS. 10A and 10B depict bottom and top views respectively of the double-sided reed tray of FIGS. 7 through 9.
Figure 10B:
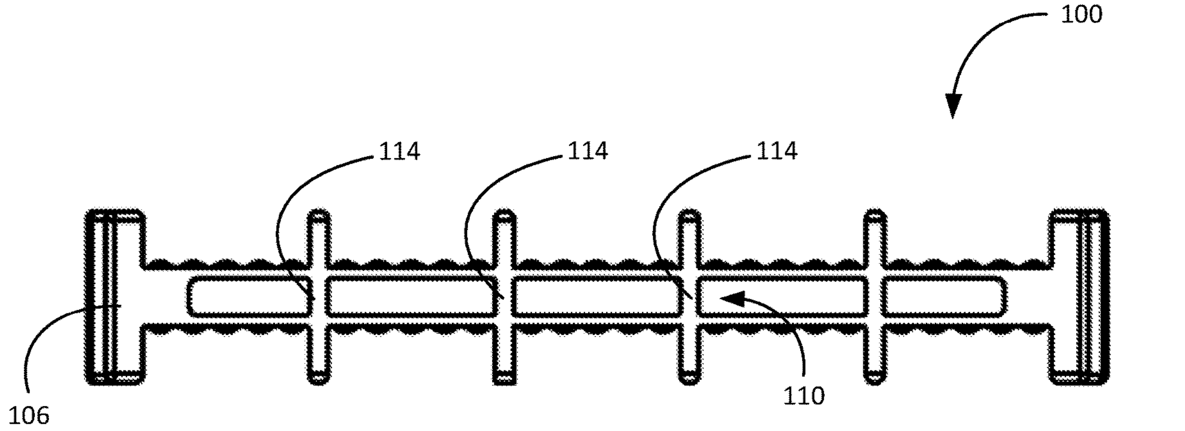

As illustrated in FIGS. 1 and 2, each guide wall 134 and outer guide wall 135 may include a notch 140. Preferably, each notch 140 is positioned on the guide wall 134 or outer guide walls 135 at the same location as the corresponding notches 140 on adjacent guide walls 134 or outer guide walls 135. It will be appreciated that each guide wall 134 or outer guide wall 135 may contain more than one notch 140. FIGS. 5 and 9 depict an elastic band 142 disposed within the notches 140 of the guide walls 134 and outer guide walls 135. The elastic band 142 extends around the first platform 102 and around the second platform 104 to secure the reeds 120 within the corresponding reed passages 132. More than one elastic band 142 may be used to secure the reeds 120.

The first platform 102 and the second platform 104 may also include a plurality of ventilation apertures 150 that permit airflow to and from the inner recess 110. The plurality of ventilation apertures 150 further permit moisture to be put in or pulled out of the reed passages 132. As depicted in the exemplary embodiment of FIG. 2, the first platform 102 may include the plurality of ventilation apertures 150 while the second platform 104 may be a solid surface that does not include the plurality of ventilation apertures 150. The exemplary ventilation apertures 150 of FIGS. 1 and 2 are circular ventilation holes that are evenly spaced in a grid-like formation of rows and columns. These exemplary ventilation holes 150 extend from the top end 106 to the bottom end 108 of the tray 100. It will be appreciated, however, that the ventilation apertures 150 may be configured in any suitable shape, shape, and relative placement that permits airflow to and from the inner recess 110. For example, the ventilation apertures 150 may be slits, windows, a combination of holes, slits, or windows, or other appropriate openings to allow the appropriate airflow around the reeds 120. The ventilation apertures 150 may also be configured at only one end of the tray 100. As illustrated in an exemplary embodiment of FIGS. 7 through 9, the ventilation apertures 150 may be configured only where a vamp 122 of the reed 120 will be positioned within each reed passage 132.

Figure 4:
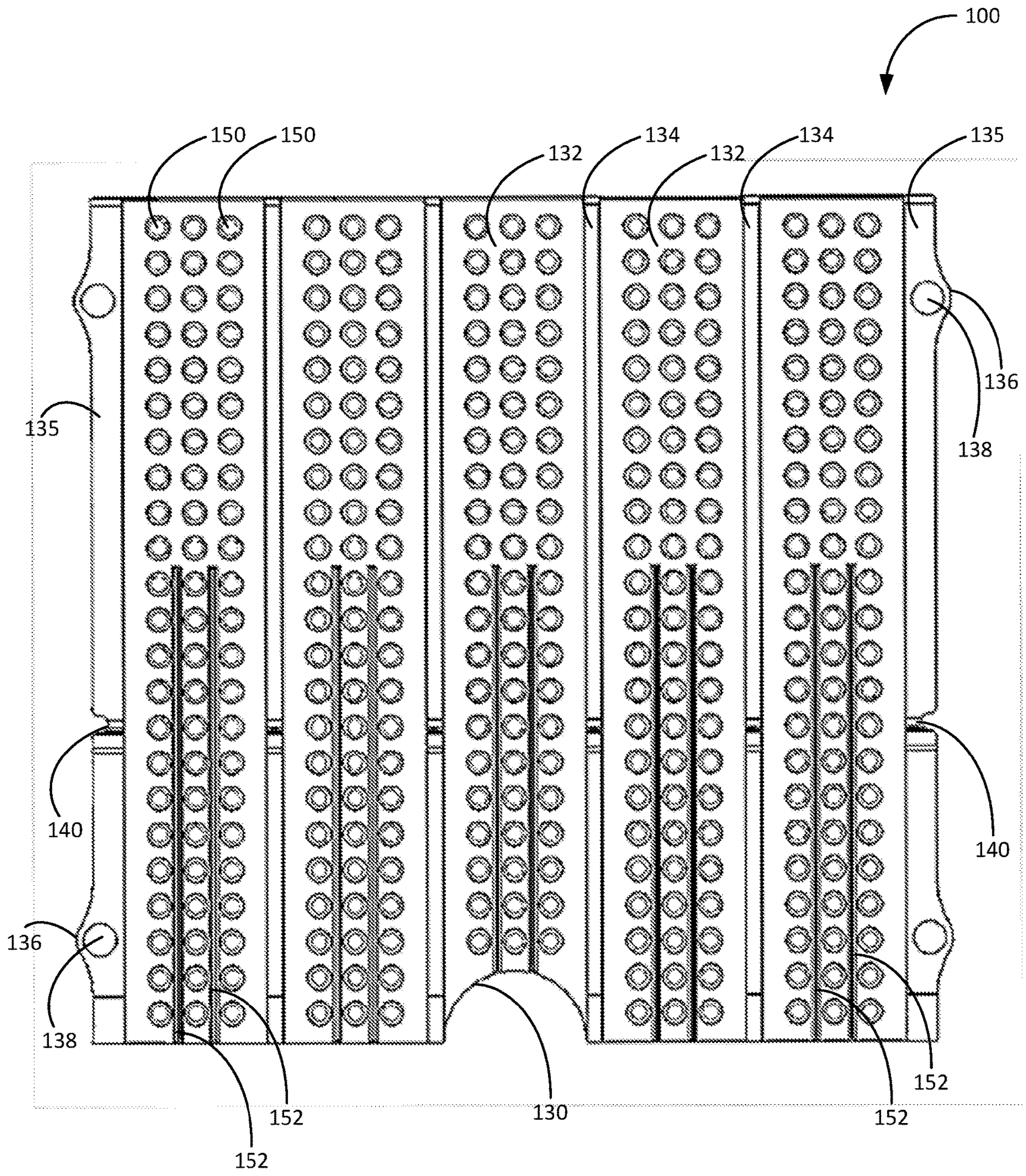
FIG. 4 depicts a side view of an example of a double-sided reed tray constructed in accordance with an illustrative embodiment disclosed herein.

Turning to FIG. 4 through 6, an example of an illustrative embodiment includes a plurality of rails 152, wherein each rail 152 is oriented parallel to any adjacent rail 152 and extends longitudinally within one of the plurality of reed passages 132. In other embodiments, each of the plurality rails 152 may be oriented perpendicular to the guide walls 134 within one of the plurality of reed passages 132. The rails 152 may be employed to elevate the reed 120 within a reed passage 132 to allow air to flow around the reed 120. Therefore, the rails 152 within each reed passage 132 should be configured to provide adequate support for balancing the reed 120 in an elevated position. In some embodiments, the rails 152 are configured to extend across approximately half of the length of the corresponding reed passage 132. As shown in FIGS. 5 and 9, a stock 124 of the reed 120 is placed on top of the rails 152 and the vamp 122 of the reed 120 is exposed on all sides, thereby providing comprehensive air ventilation to the vamp 122.

FIGS. 4 through 6 illustrate an embodiment wherein each of the reed passages 132 includes two rails 152, and FIGS. 7 through 10 illustrate a separate exemplary embodiment wherein each of the reed passages 132 includes five rails 152. It will be understood, however, that a different number of rails 152 may be configured within each of the reed passages 132. For example, 2, 3, 4, 5, 6, 7, 8, 9 or 10 rails 152 may be included within each of the reed passages 132. As shown in FIGS. 4 through 6, the rails 152 may be rectangular with a flat surface for receiving the reed 120. FIGS. 7 through 10 illustrate that the rails 152 may, alternatively, have a curved surface for receiving the reed 120.

Figure 7:
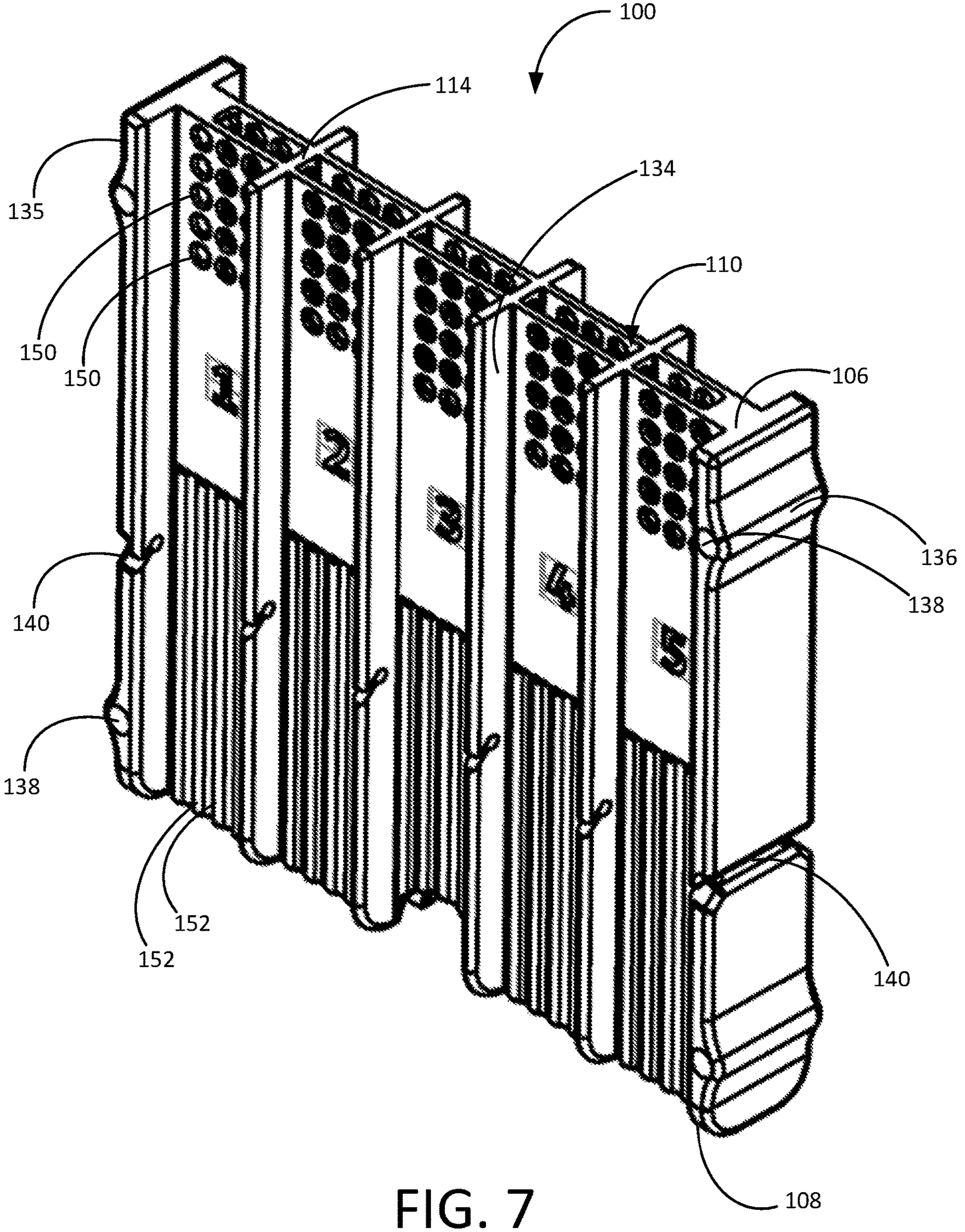
FIG. 7 depicts a perspective view of a first side of a double-sided reed tray constructed in accordance with an illustrative embodiment disclosed herein.
Figure 8:
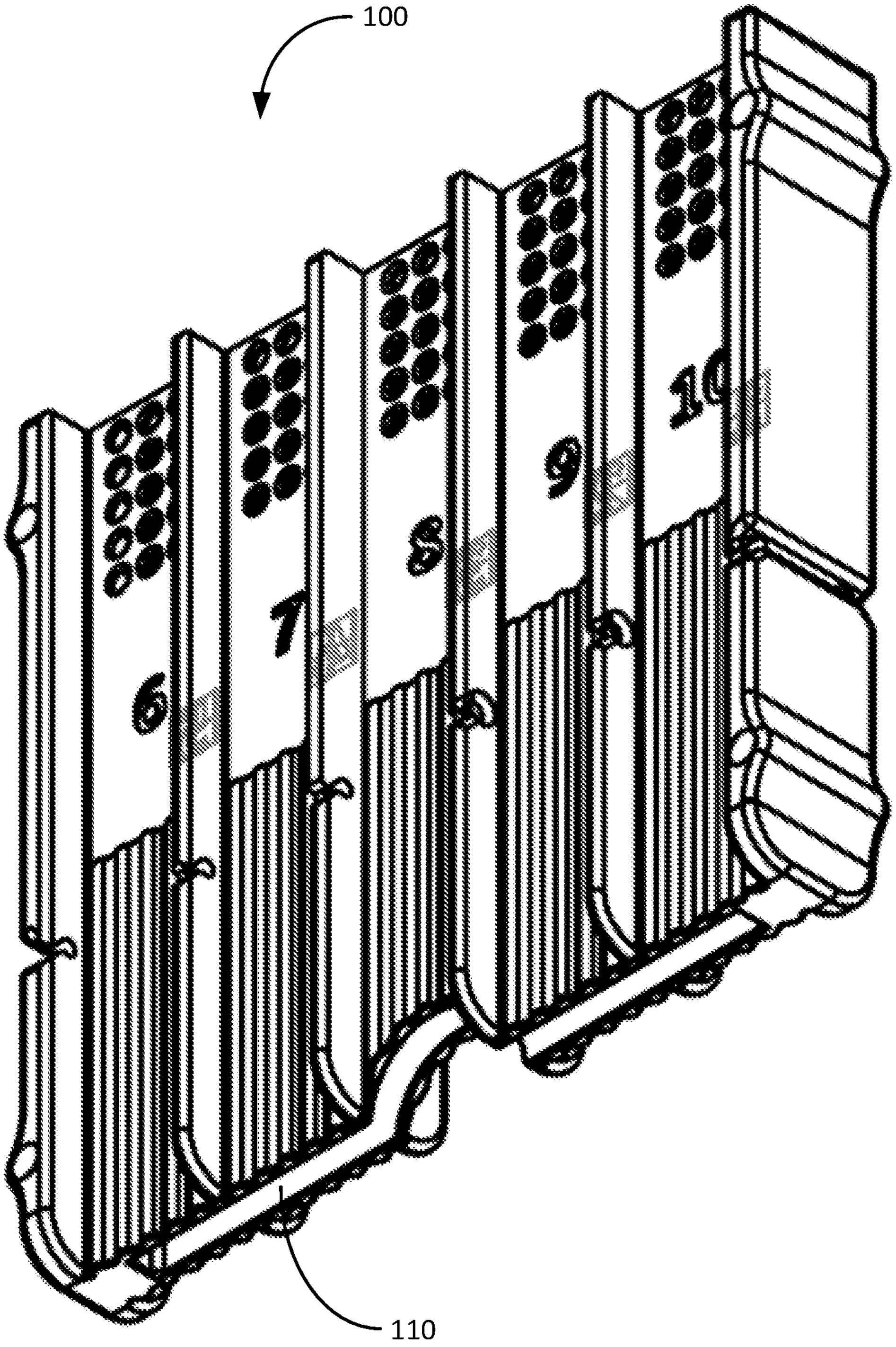
FIG. 8 depicts a perspective view of a second side of the double-sided reed tray of FIG. 7.

FIGS. 7 through 9 illustrate that the reed passages 132 of the tray 100 may be numbered. Although FIGS. 7 through 9 depict a tray 100 with five reed passages 132 on the first platform 102 and five reed passages 132 on the second platform 104, it will be appreciated that the tray 100 may be configured with a different number of reed passages 132 per platform 102, 104. The first platform 102 and second platform 104 may have the same number of reed passages 132. For example, the platforms 102, 104 may each have 2, 3, 4, 5, 6, 7, 8, 9 or 10 reed passages 132. In other embodiments, the first platform 102 may have a different number of reed passages 132 than the second platform 104.

Figure 11:
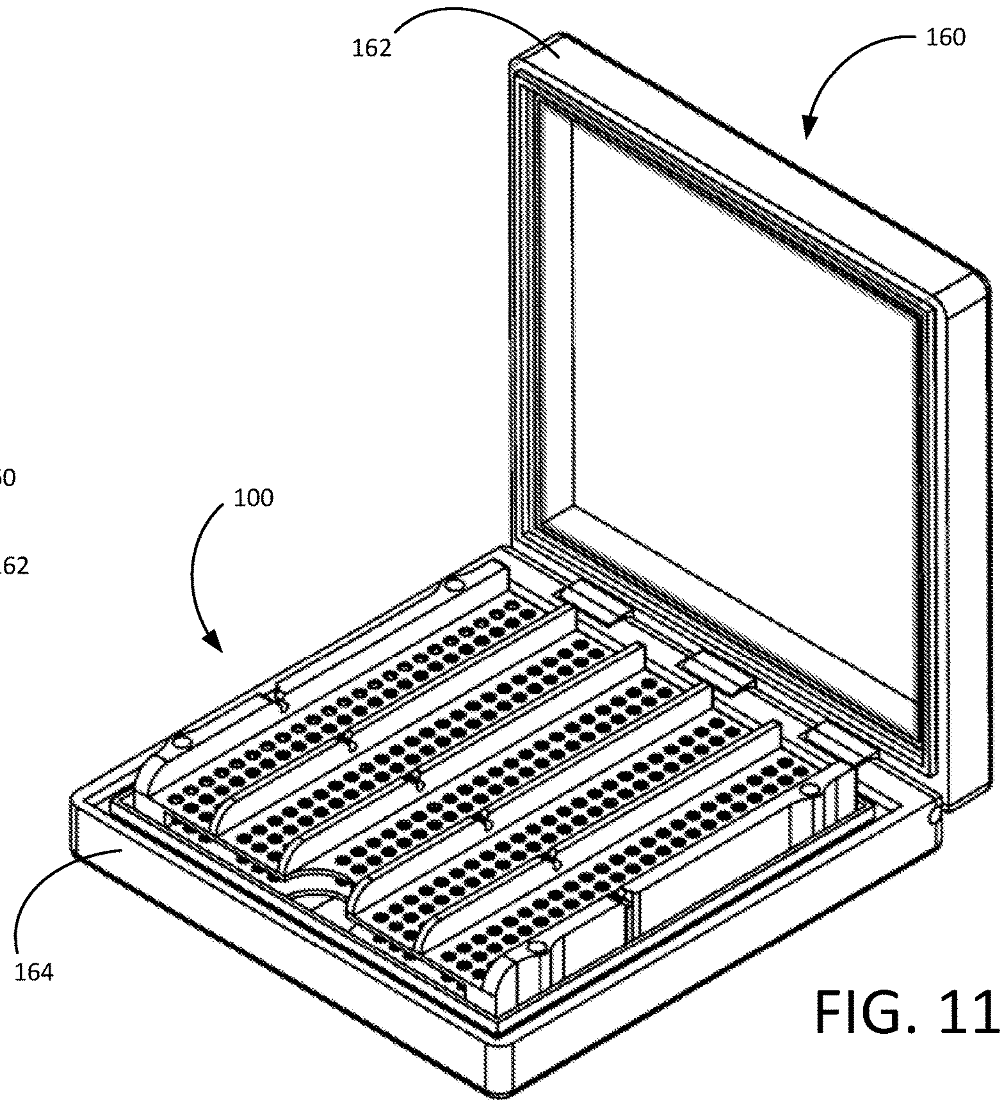
FIG. 11 depicts a perspective view of a case constructed in accordance with an illustrative embodiment disclosed herein in use with the double-sided reed tray of FIGS. 1 and 2.
Figure 12:
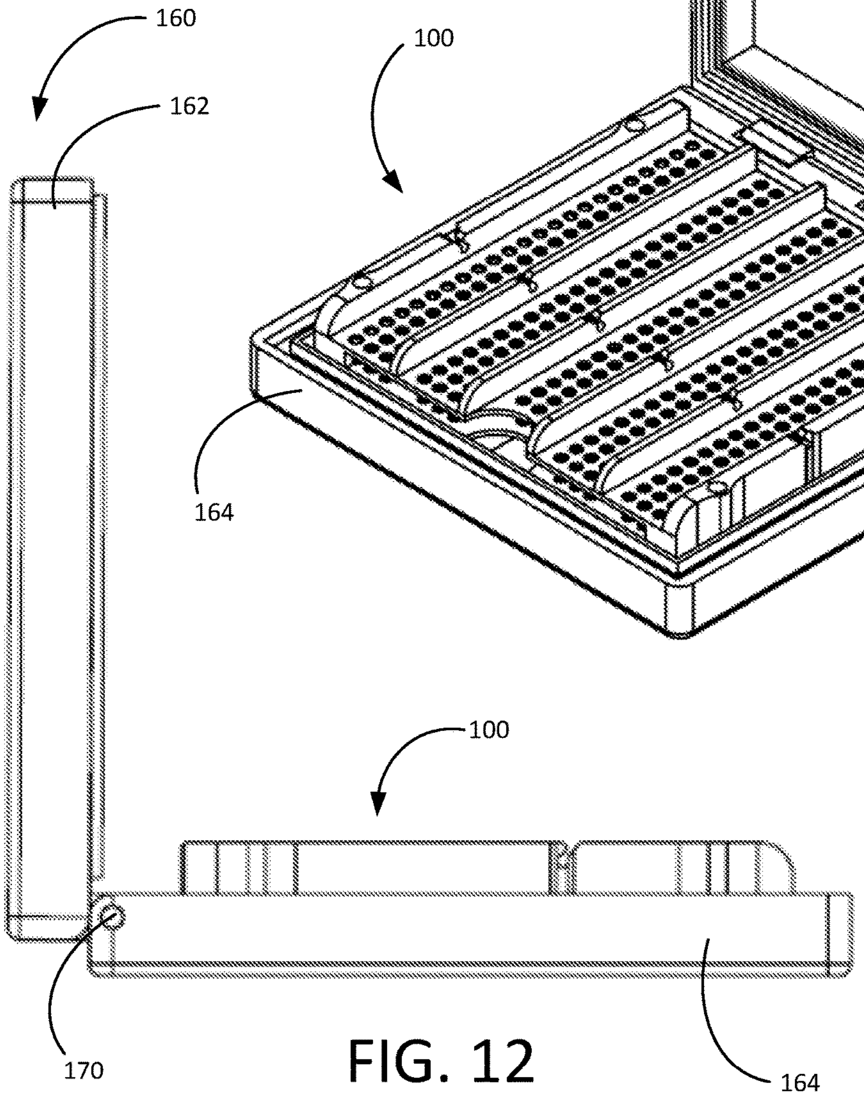
FIG. 12 depicts a side view of the case of FIG. 11.
Figure 13:
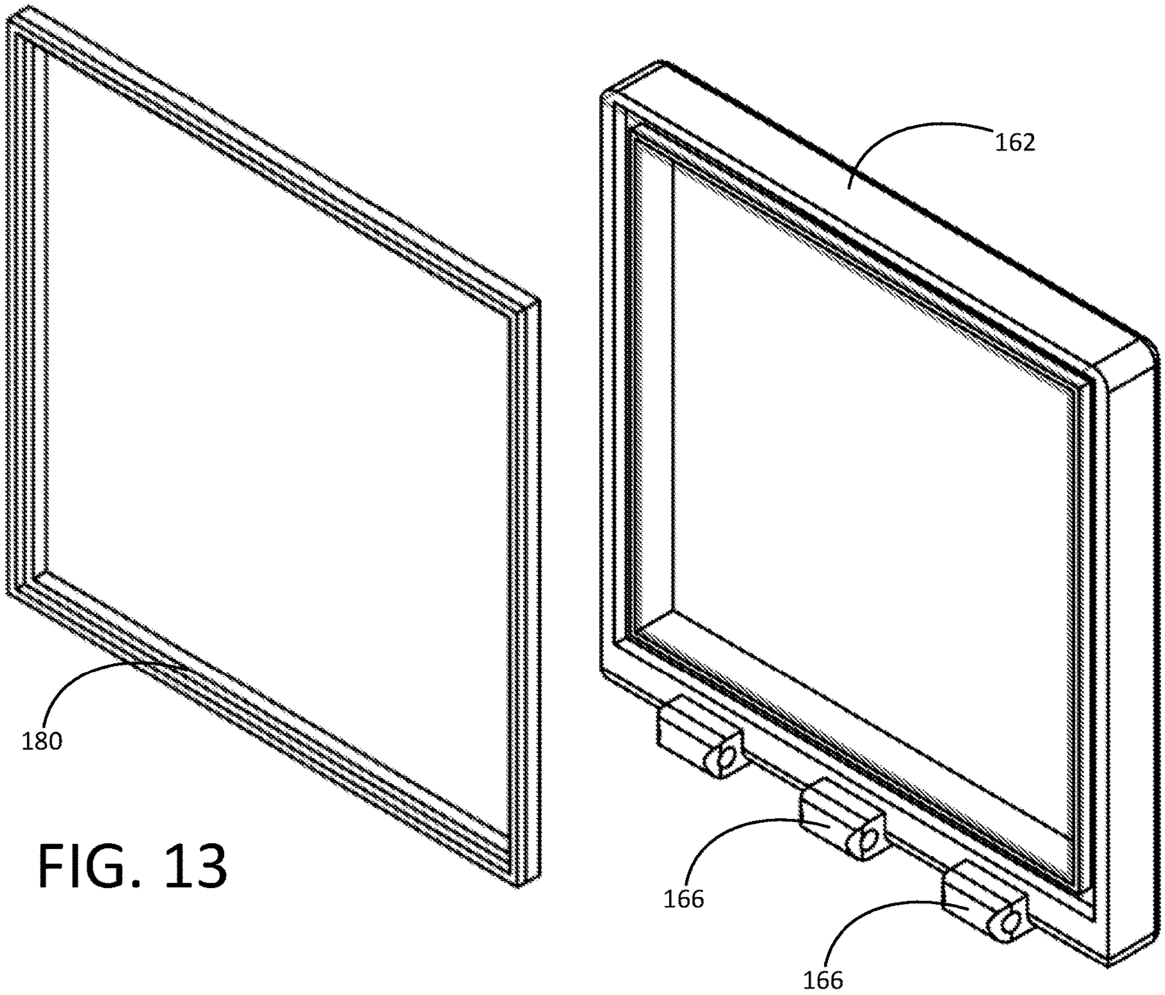
FIG. 13 depicts an exploded perspective view of a lid and a corresponding O-ring gasket for the case of FIGS. 11 and 12.
Figure 14:
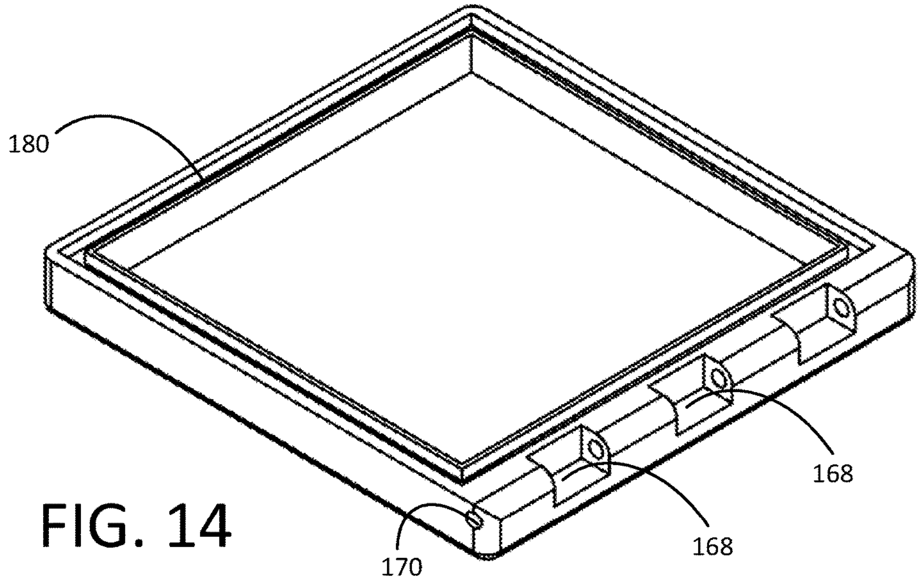
FIG. 14 depicts a perspective view of a base for the case of FIGS. 11 and 12.
Figure 15A:
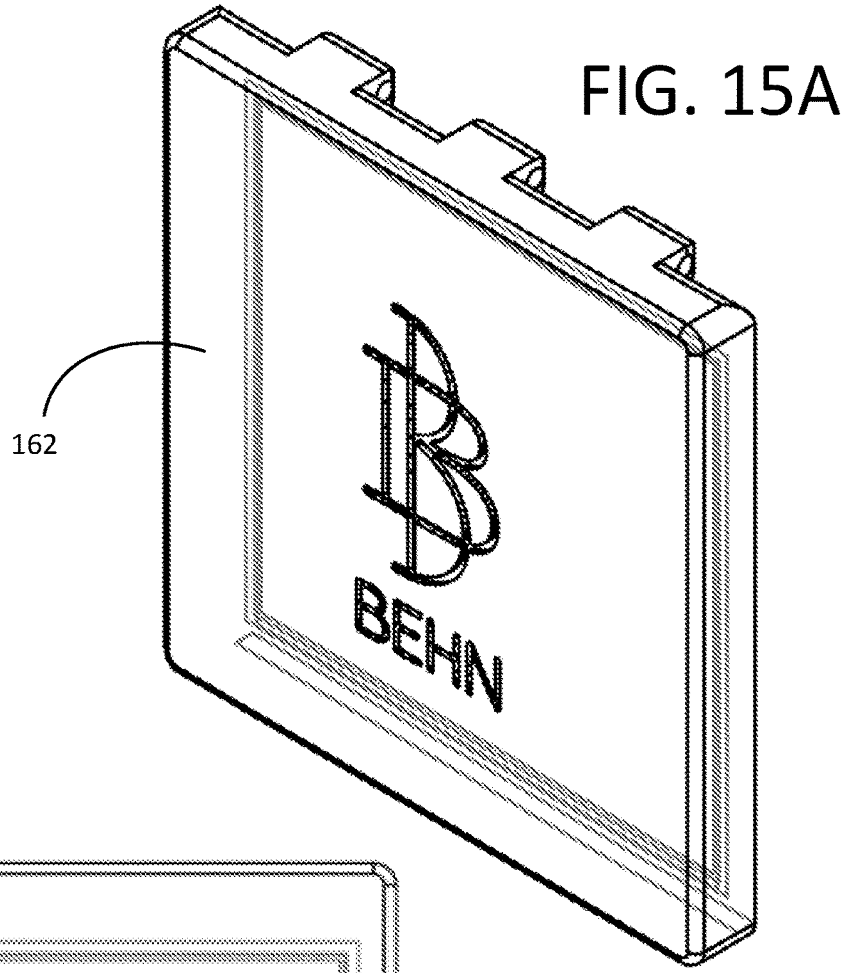
FIGS. 15A and 15B depict an example embodiment of a lid with decorative elements.
Figure 15B:

FIGS. 11 through 14 illustrate an airtight case 160 shown in accordance with an exemplary embodiment, wherein the case 160 is configured to receive the tray 100 such that the reed passages 132 are oriented horizontally. Although FIG. 11 depicts the case 160 in use with the tray 100 illustrated in FIGS. 1 and 2, it will be appreciated that this case 160 may also be used with the tray 100 constructed with a same size but in accordance with other embodiments, including the exemplary embodiment of FIGS. 4 through 6 and the exemplary embodiment of FIGS. 7 through 10. This exemplary case 160 of FIGS. 11 through 14 includes a lid 162 with one or more protrusions 166, a base 164 with one or more hollows 168 that are each configured to receive a corresponding one of the protrusions 166, and a pin (not shown) that extends through a pin aperture 170 to connect the lid 162 to the base 164. The case 160 may further include an O-ring gasket 180 within the lid 162 and a separate O-ring gasket 180 within the base 164, wherein the two O-ring gaskets 180 provide an airtight seal when closed. The lid 162 or the base 164 may optionally include decorative elements. FIGS. 15A and 15B present an example of the lid 162 with a logo and a brand name.

Figure 16A:
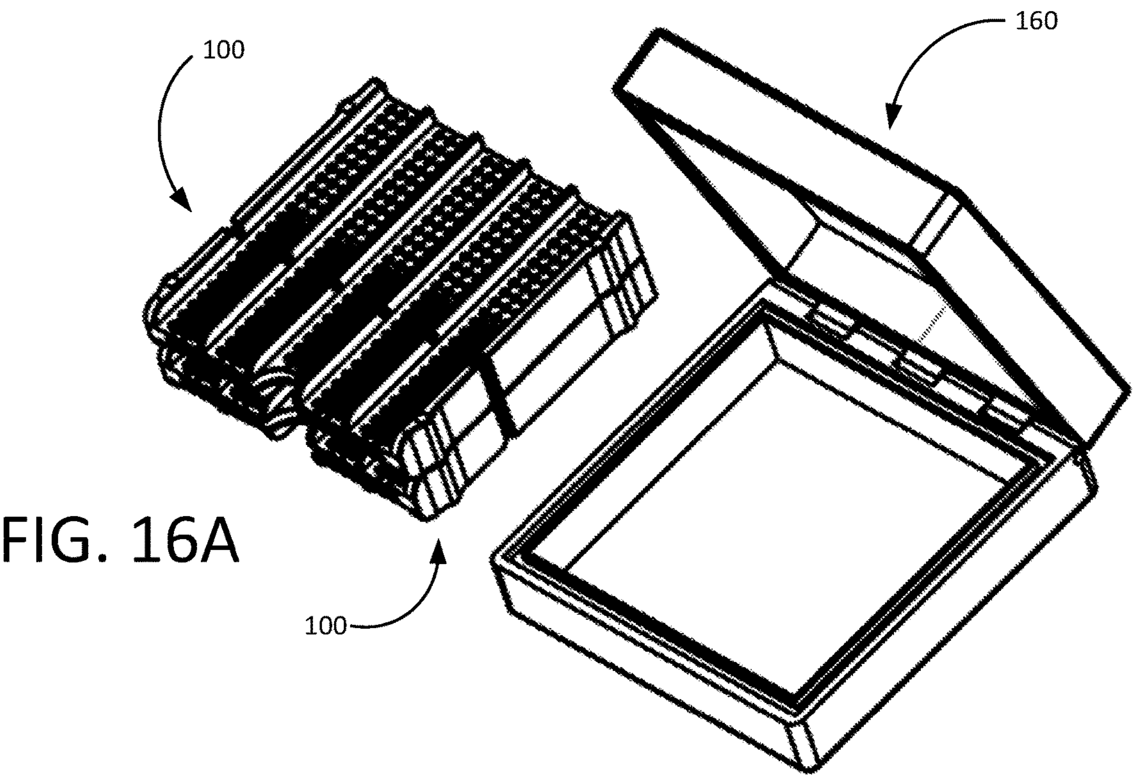
FIGS. 16A and 16B depict perspective views of a case constructed in accordance with an illustrative embodiment disclosed herein in use with two stacked double-sided reed trays.
Figure 16B:
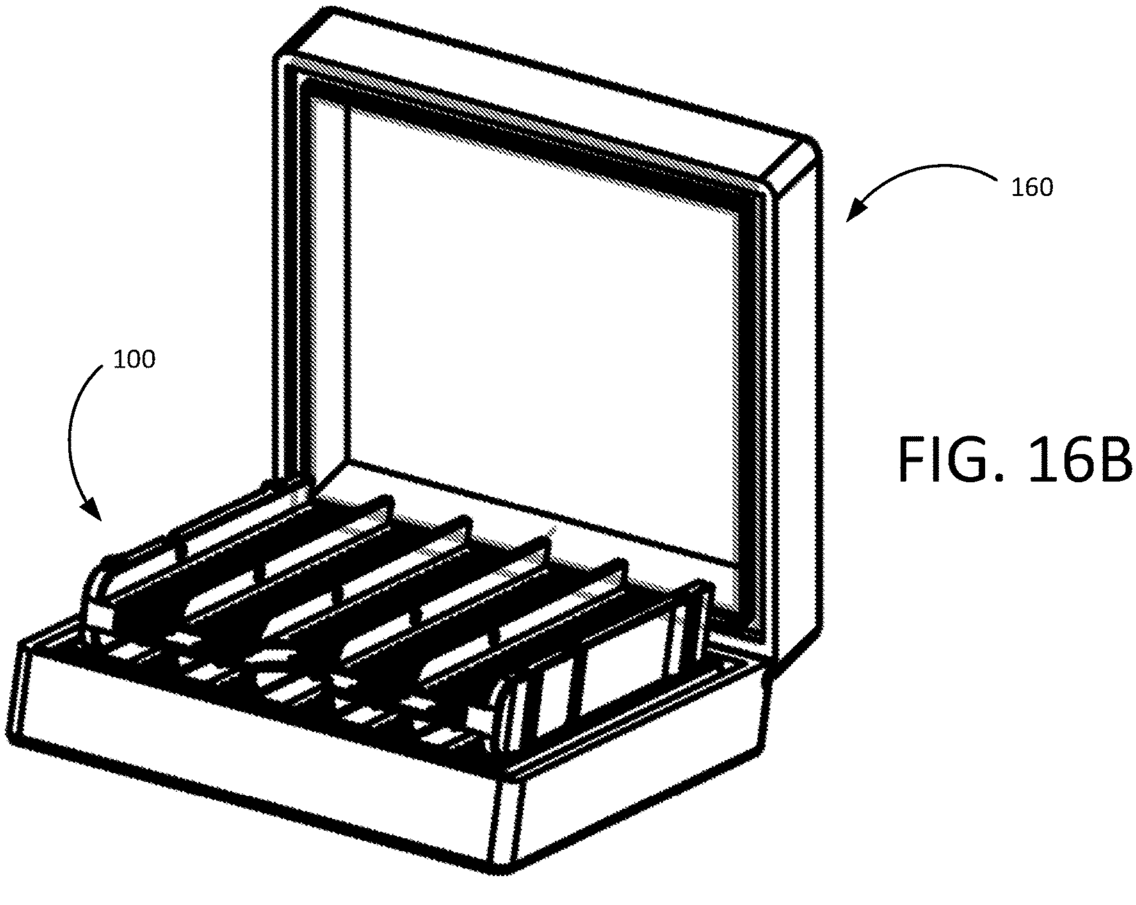
Figure 19:
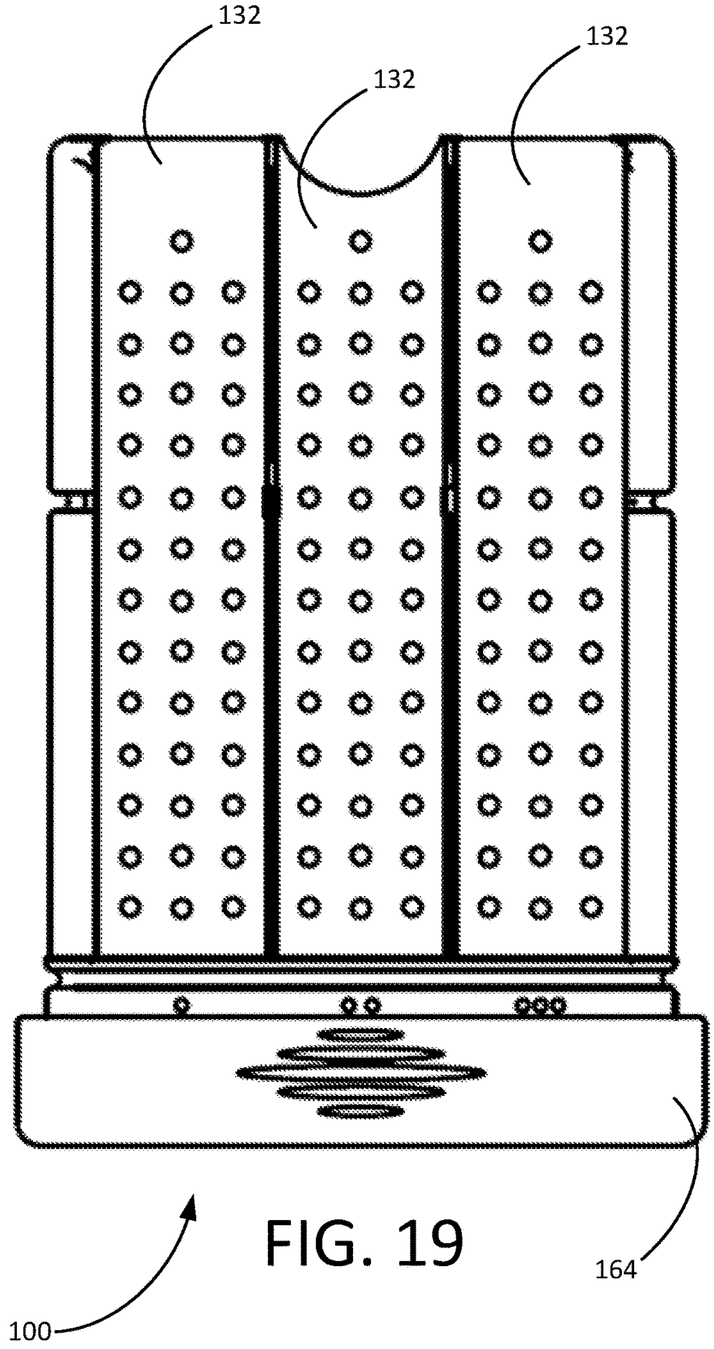
FIG. 19 depicts a front view for the double-sided reed tray of FIGS. 17 and 18.
Figure 20:
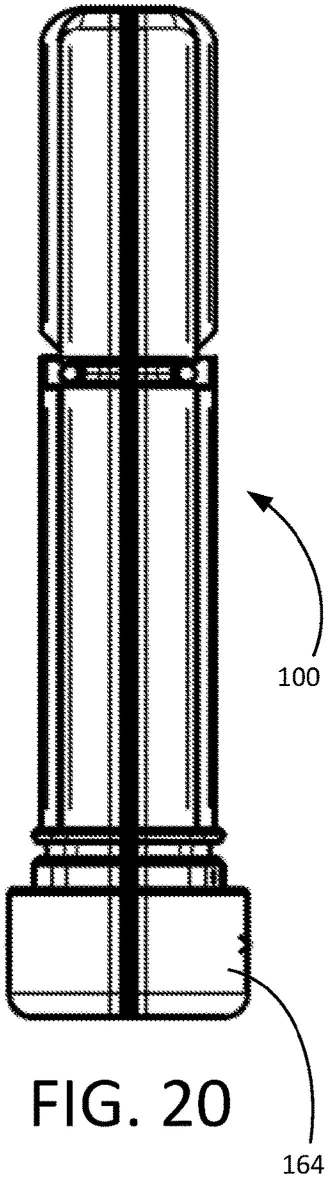
FIG. 20 depicts a side view for the double-sided reed tray of FIGS. 17 and 18.

FIGS. 16A and 16B illustrate the airtight case 160 constructed in accordance with another exemplary embodiment, wherein the case 160 is configured to receive two trays 100 that are removably stacked together. The lid 162 and the base 164 of this embodiment are sized to provide an airtight seal when closed. It will be understood that the airtight case 160 may be configured to receive more than two trays 100.

Figure 21A:
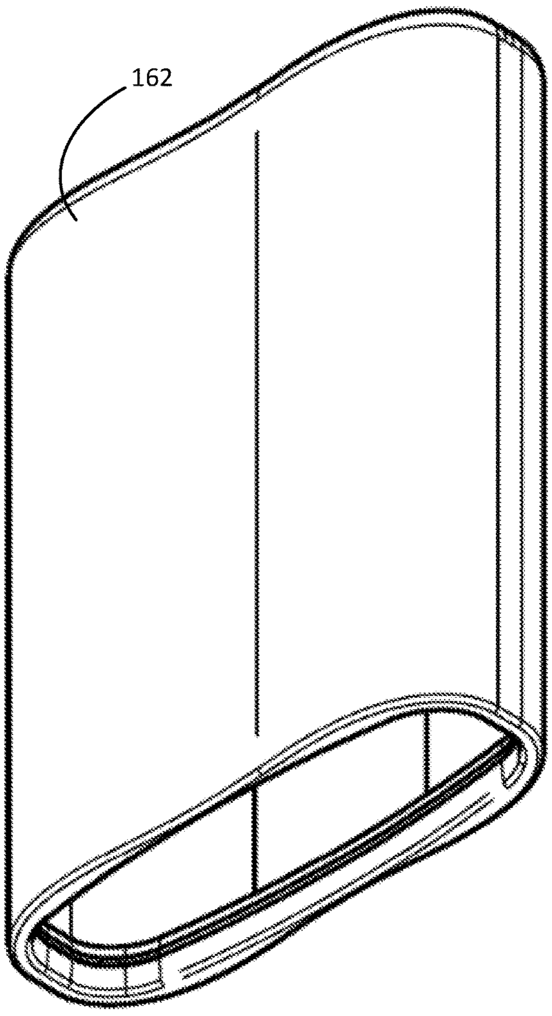
FIGS. 21A and 21B depict perspective views for a cover for the double-sided reed tray of FIGS. 17 through 20.
Figure 21B:
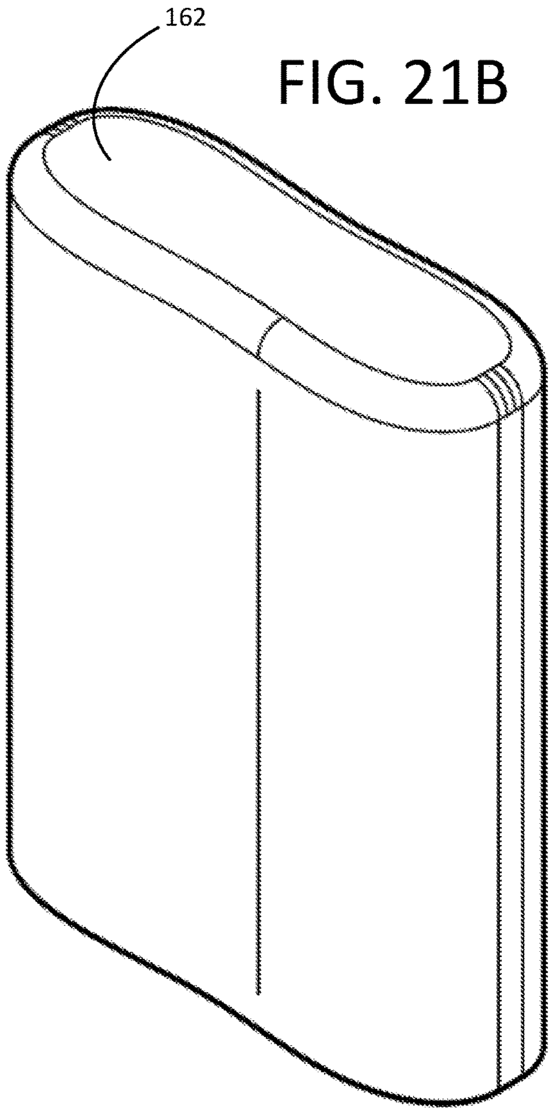

FIGS. 17 through 20 illustrate the airtight case 160 constructed in accordance with another exemplary embodiment. In this embodiment, the base 164 is configured to receive the tray 100 such that the slot 112 through which the humidity-control insert (not shown) may be placed into the inner recess 110 is exposed. As depicted in FIGS. 17 through 20, the base 164 is also configured to receive the tray 100 such that the reed passages 132 of the tray 100 are oriented vertically. The base 164 may be removably connected to or integrated with the tray 100. FIGS. 21A and 21B depict that the lid 162 is configured to slide over the tray 100 of FIGS. 17 through 20 and to contact the base 164, thereby forming an airtight seal.

Notwithstanding the foregoing examples, it will be appreciated that the tray 100 may be placed in any suitable airtight container, including a resealable plastic bag.

The description of the invention is intended to be read in connection with the accompanying drawings, which are to be considered part of the entire written description of this invention. In the description, relative terms such as “front,” “rear,” “lower,” “upper,” “horizontal,” “vertical,” “above,” “below,” “up,” “down,” “top” and “bottom” as well as derivatives thereof (e.g., “horizontally,” “downwardly,” “upwardly” etc.) should be construed to refer to the orientation as then described or as shown in the drawings under discussion. These relative terms are for convenience of description and do not require that the machine be constructed or the process to be operated in a particular orientation. Terms, such as “connected,” “connecting,” “attached,” “attaching,” “join” and “joining” are used interchangeably and refer to one structure or surface being secured to another structure or surface or integrally fabricated in one piece.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description and with respect to the attached claims.

The invention claimed is:

1. A storage apparatus for reeds, wherein the storage apparatus comprises:
- a tray comprising:
  - a first platform, wherein the first platform comprises a first plurality of reed passages;
  - a second platform configured opposite from the first platform;
  - an inner recess between the first platform and the second platform; and
  - a first plurality of ventilation apertures configured on the first platform and the second platform.

2. The storage apparatus of claim 1, wherein an end of the tray comprises a slot to receive a humidity-control insert.

3. The storage apparatus of claim 1, wherein the tray further comprises a second plurality of ventilation apertures configured on the second platform, and the second platform comprises a second plurality of reed passages.

4. The storage apparatus of claim 3, wherein each of the first and second plurality of reed passages is further configured to hold a reed between two guide walls.

5. The storage apparatus of claim 4, wherein each of the first and second plurality of ventilation apertures is positioned between the guide walls of one of the first or second plurality of reed passages.

6. The storage apparatus of claim 3, wherein each of the first and second plurality of reed passages further comprises a plurality of rails, wherein the rails are configured to elevate a reed within the corresponding reed passage.

7. The storage apparatus of claim 4 further comprising an elastic band, wherein the elastic band extends across the first platform and the second platform.

8. The storage apparatus of claim 7, wherein each of the guide walls comprises a notch and wherein the elastic band is received within the notches.

9. The storage apparatus of claim 4, wherein one or more of the guide walls comprises a stacking aperture.

10. The storage apparatus of claim 9, wherein a magnet is configured within the stacking aperture.

11. The storage apparatus of claim 10, wherein the tray is magnetically secured to a second tray by the magnet within the stacking aperture.

12. A storage apparatus for single reeds, wherein the apparatus comprises:
- an airtight container; and
- a tray comprising:
  - a first platform, wherein the first platform comprises a first plurality of reed passages;
  - a second platform configured opposite from the first platform, wherein the second platform comprises a second plurality of reed passages;
  - an inner recess between the first platform and the second platform; and
  - a plurality of ventilation apertures configured on the first platform and the second platform, wherein the airtight container is configured to receive the tray therein.

13. The storage apparatus of claim 12, wherein an end of the tray comprises a slot to receive a humidity-control insert.

14. The storage apparatus of claim 12, wherein each of the first and second plurality of reed passages further comprises a plurality of rails, wherein the rails are configured to elevate a reed within the corresponding reed passage.

15. The storage apparatus of claim 12, wherein each of the first and second plurality of reed passages is configured to hold a reed between two guide walls.

16. The storage apparatus of claim 15 further comprising an elastic band, wherein the elastic band extends across the first platform and the second platform; and wherein the elastic band is received within a notch configured on each guide wall.

17. The storage apparatus of claim 12, wherein the airtight container is a case comprising a lid, a base, and an O-ring gasket.

* * * * *